United States Patent [19]
Hashimoto et al.

[11] Patent Number: 5,141,808
[45] Date of Patent: Aug. 25, 1992

[54] MAGNETIC RECORDING MEDIUM HAVING TWO MAGNETIC LAYERS EACH CONTAINING A SPECIFIED POLYURETHANE RESIN

[75] Inventors: Hiroshi Hashimoto; Kazuo Hasumi; Tsutomu Okita, all of Kanagawa, Japan

[73] Assignee: Fuji Photo Film Co., Ltd., Kanagawa, Japan

[21] Appl. No.: 309,576

[22] Filed: Feb. 13, 1989

[30] Foreign Application Priority Data

Feb. 12, 1988 [JP] Japan .................. 63-30307

[51] Int. Cl.⁵ .................................. G11B 5/00
[52] U.S. Cl. .................................. 428/336; 428/694; 428/423.3; 428/425.9; 428/424.6; 428/900
[58] Field of Search ............ 428/900, 694, 423.3, 428/425.9, 336, 424.6

[56] References Cited

U.S. PATENT DOCUMENTS

| | | | |
|---|---|---|---|
| 4,699,969 | 10/1987 | Re et al. | 528/70 |
| 4,795,672 | 1/1989 | Takeda et al. | 428/216 |
| 4,857,388 | 8/1989 | Ogawa et al. | 428/212 |
| 4,980,230 | 12/1990 | Saito et al. | 428/329 |

*Primary Examiner*—Paul J. Thibodeau
*Assistant Examiner*—Stevan A. Resan
*Attorney, Agent, or Firm*—Sughrue, Mion, Zinn, Macpeak & Seas

[57] ABSTRACT

A magnetic recording medium comprising a nonmagnetic support having thereon a lower magnetic layer and a upper magnetic layer, in this order, wherein the lower magnetic layer contains as a binder a polyurethane reisn having a number average molecular weight of less than 25,000, and the upper magnetic layer contains as a binder (a) a polyurethane resin having (i) at least three organic groups having an active hydrogen per polyurethane molecule and (ii) a number average molecular weight of 25,000 or more, and (b) a polyisocyanate.

14 Claims, No Drawings

MAGNETIC RECORDING MEDIUM HAVING TWO MAGNETIC LAYERS EACH CONTAINING A SPECIFIED POLYURETHANE RESIN

FIELD OF THE INVENTION

This invention relates to a magnetic recording medium comprising a non-magnetic support and a magnetic layer, and more particularly it relates to a magnetic recording medium having at least two magnetic layers.

BACKGROUND OF THE INVENTION

Magnetic recording media have widely been used as audio tapes, video tapes as floppy disks. A magnetic recording medium is basically comprised of a non-magnetic support laminated with a magnetic layer containing ferromagnetic particles dispersed in a binder.

It is necessary for a magnetic recording medium to have high level characteristics such as excellent electromagnetic conversion characteristics, good running durability and good running efficiencies. That is, a high capability for reproducing original sounds is necessary for an audio tape for recording and reproducing music. Also, excellent electromagnetic conversion characteristics, such as a high capability for reproducing original images, are necessary for video tapes.

As described above, both excellent electromagnetic conversion characteristics and good running durability are required for a magnetic recording medium. Generally, abrasive agents and lubricating agents play important roles in achieving good running durability.

In order to obtain excellent running durability by adding abrasive agents, it is necessary to increase additive amounts thereof, thereby decreasing the amount of ferromagnetic particles. When abrasive agents having a large particle size are used to obtain excellent running durability, the abrasive agents are likely to extrude excessively on the surface of the magnetic layer. Accordingly, the improvement of running durability by adding abrasive agents tends to deteriorate electromagnetic conversion characteristics.

Also, when running durability is improved by adding lubricating agents, it is necessary to increase the additive amount thereof. Therefore, the binder is likely to be plasticized and thus the durability of the magnetic layer tends to decrease.

As another approach for improving running durability, the hardness of the magnetic layer has been increased by using a hard binder. However, increasing the hardness of the magnetic layer undesirably causes the magnetic layer to become strikingly fragile; drop out readily occurs when the magnetic head causes in contact with the magnetic layer and still life characteristics are deteriorated.

JP-A-58-153224 discloses a magnetic recording medium comprised of polyisocyanate, polyurethane resins having a hydroxyl group and having a molecular weight of less than 10,000 and resins which have at least one active hydrogen atom. Also, JP-A-59-136365 and U.S. Pat. No. 4,576,726 disclose a magnetic recording medium comprised of polyisocyanate and polyurethane resins in which hydroxyl groups are formed by ring-opening of expoxy rings. (The term "JP-A" as used herein means an "unexamined published Japanese patent application".)

As described above, polyurethane resins (or other resins) having an active hydrogen (such as a hydroxyl group) are highly reactive with polyisocyanate, and therefore such polyurethane resins and polyisocyanate react sufficiently, i.e. they cross-link. Such cross-linking make the magnetic layer remarkably strong. As a result, even after a long term storage, a magnetic layer having greater output and excellent durability can be obtained. However, the above-described magnetic layer does not completely adhere to a non-magnetic support, and therefore sufficiently excellent running durability cannot always be obtained.

Accordingly, a magnetic recording medium having reduced occurrences of drop outs and excellent still-life characteristics, i.e. having excellent running durability has not yet been obtained.

SUMMARY OF THE INVENTION

An object of this invention is to provide a magnetic recording medium having reduced occurrences of drop outs, excellent still-life characteristics and strong adhesiveness between the magnetic layer and the non-magnetic support in order to provide excellent running durability.

Other objects and effects of this invention will be apparent from the following description.

This invention relates to a magnetic recording medium comprising a non-magnetic support having thereon a lower magnetic layer and a upper magnetic layer, in this order, wherein the lower magnetic layer contains as a binder a polyurethane resin having a number average molecular weight (Mn) of less than 25,000, and the upper magnetic layer contains as a binder (a) a polyurethane resin having (i) at least three organic groups having an active hydrogen per polyurethane molecule and (ii) a number average molecular weight (Mn) of 25,000 or more, and (b) polyisocyanate.

DETAILED DESCRIPTION OF THE INVENTION

The preferred embodiments of the magnetic recording medium of this invention are as follows.

1) The above-described magnetic recording medium wherein the polyurethane resin contained in the lower magnetic layer has a glass transition temperature (Tg) of less than 0° C.

2) The above-described magnetic recording medium wherein the polyurethane resin contained in the upper magnetic layer has a glass transition temperature (Tg) of 0° C. or higher.

3) The above-described magnetic recording medium wherein each of the organic groups having active hydrogen is selected from the groups consisting of —OH, —NH$_2$ and —NHR, wherein R is an alkyl group preferably having from 1 to 3 carbon atoms.

4) The above-described magnetic recording medium wherein the above-described binder in the upper magnetic layer and/or in the lower magnetic layer contains a vinyl chloride copolymer in addition to the polyurethane resin.

As described above, this invention relates to a magnetic recording medium having at least two magnetic layers. The lower magnetic layer uses a binder comprising polyurethane type resins having a low number average molecular weight, and the upper magnetic layer uses a binder comprising polyurethane resins having at least three organic groups having active hydrogen per a molecule and having a large number average molecular weight and polyisocyanate.

The upper magnetic layer of this invention has extremely high cross-linking density due to the above-described structure and is an extremely tough magnetic layer, and therefore is excellent in running durability. Further, since the resin used in the lower magnetic layer of the present invention is soft, the adhesiveness between the magnetic layers and the non-magnetic support is strong. Accordingly, since the magnetic layers of the present invention are extremely firmly adhered to the non-magnetic support, running durability and the durability of the magnetic recording medium itself can be remarkably improved. Also in this invention, since the lower magnetic layer uses a polyurethane resin having a comparatively low molecular weight, the dispersibility of the ferromagnetic particles and the surface smoothness of the magnetic layer are excellent, and therefore the electromagnetic conversion characteristics are also excellent.

Accordingly, this invention provides a magnetic recording medium which exhibits excellent running durability without deteriorating electromagnetic conversion characteristics.

The magnetic recording medium of this invention is basically comprised of a non-magnetic support having provided thereon at least two magnetic layers containing ferromagnetic particles dispersed in a binder.

The non-magnetic supports which can be used in this invention include films or sheets comprising polyesters such as polyethylene terephthalate (PET) or polyethylene naphthalate; polyolefins such as polypropylene; cellulose derivatives such as cellulose triacetate or cellulose diacetate; vinyl resins such as polyvinyl chloride or polyvinylidene chloride; synthetic resins such as polycarbonate, polyamide, polyamide imide or polyimide; foils of non-magnetic metals such as aluminum or copper; foils of metals such as a stainless foil; paper; and ceramic sheet.

The support preferably has a thickness of from 2.5 to 100 $\mu$m, more preferably from 3 to 80 $\mu$m.

In the magnetic recording medium of this invention, both lower and upper magnetic layers contain as a binder a polyurethane resin, and the upper magnetic layer further contains polyisocyanate. The polyurethane contained in the upper magnetic layer has (i) at least three organic groups having an active hydrogen per polyurethane molecule and (ii) a number average molecular weight (Mn) of 25,000 or more, and the polyurethane resin contained in the lower magnetic layer has a number average molecular weight (Mn) of less than 25,000.

The above-described lower magnetic layer of this invention is designed to use comparatively low molecular weight polyurethane resins (i.e. having a number average molecular weight of less than 25,000) in order to improve both the dispersibility of the ferromagnetic particles and the surface smoothness of the magnetic layer. The polyurethane resin contained in the lower magnetic layer preferably has a glass transition temperature of less than 0° C., and preferably has a number average molecular weight of from 5,000 to 20,000, and more preferably from 8,000 to 15,000.

As described above, by making the resin composition of the lower magnetic layer soft, the adhesive strength between the magnetic layer and the non-magnetic support becomes greater, and, therefore, the durability of the magnetic recording medium, that is, its running durability, can be improved.

The upper magnetic layer of this invention comprises polyisocyanate and a polyurethane resin. In order to increase the cross-linking density of the upper magnetic layer, the polyurethane resin has at least three organic groups having an active hydrogen per polyurethane molecule. Also, the polyurethane resin of the upper layer has a number average molecular weight of 25,000 or more. The polyurethane resin having at least three organic groups having an active hydrogen per molecule is highly reactive with polyisocyanate, and therefore reacts by cross-linking with polyisocyanate to such an extent that hardly any of the polyurethane resin fails to react with polyisocyanate. Therefore, the thus formed upper magnetic layer is highly cross-linked, producing extremely tough layer, thereby the upper magnetic layer has reduced occurrences of drop outs and has excellent still-life characteristics. Preferably, the glass transition temperature of the polyurethane resin contained in the upper magnetic layer is 0° C. or higher, and preferably the number average molecular weight thereof is from 25,000 to 50,000.

Examples of the aforementioned organic groups having an active hydrogen include —OH, —SH, —NH$_2$, =NH, —CSNH$_2$, —SCNHR, —C(=NH)OH, —C(=NH)NH, =NOH, —NHNH$_2$, —CONHNH$_2$, —NRNH$_2$, —NHNHR, =NNH$_2$, =N—NHR, —NHCONH$_2$, —NHCONHR, —NHCSNH$_2$, —NHCSNHR, —NRCSNH$_2$, —NRCONH$_2$, —NHC(=NR)NH$_2$, —NHC(=NH)NHR, biguanidine and burett, wherein R is an alkyl group preferably having from 1 to 3 carbon atoms. Among these, —CH, —NH$_2$ and —NHR are preferred. One kind or two or more kinds of these organic groups may be included in each molecule of polyurethane resin in the upper layer.

The upper magnetic layer of this invention is an extremely tough magnetic layer and is therefore excellent in running durability.

As described above, by making the resin composition of the lower magnetic layer soft, the adhesive strength between the magnetic layer and the non-magnetic support becomes great. Thus, the running durability and the physical durability of the magnetic recording medium can be remarkably improved. Also, by making the lower magnetic layer soft, the lower magnetic layer plays the role of a buffer layer for the tough upper magnetic layer, and thus, durability characteristics such as still-life durability can effectively be improved. The lower magnetic layer of this invention uses a comparatively low molecular weight polyurethane resin, and therefore the dispersibility of the ferromagnetic particles and the surface smoothness of the ferromagnetic particles and the surface smoothness of the magnetic layer are excellent. Thus, the electromagnetic conversion characteristics of the magnetic recording medium are good.

The polyurethane resin used in each magnetic layer of this invention is not particularly limited and may include, e.g., a polyester polyurethane resin; a polyether polyurethane resin; a polyurethane resin having polar groups such as hydroxyl groups, carboxyl groups, phosphoric acid groups, phosphoric acid ester groups, —SO$_3$Na or —SO$_2$Na; and a polycarbonate polyurethane resin.

Besides the above-described polyurethane resin, other resins which can be included as a binder for forming each magnetic layer ar not particularly limited. Resins which can be used as a binder include vinyl chloride copolymer (e.g., a vinyl chloride/vinyl acetate copolymer, a vinyl chloride/vinyl acetate/vinyl alcohol copolymer, a vinyl chloride/vinyl acetate/acrylic acid copolymer, a vinyl chloride/vinylidene chloride copolymer, a vinyl chloride/acrylonitrile copolymer, an ethylene/vinyl acetate copolymer); cellulose derivatives such as nitrocellulose resin; acrylic resins; polyvinyl acetal resins; polyvinyl butyral resins; epoxy resins; and phenoxy resins.

Among the above resins, more preferred resins are vinyl chloride copolymer resins having a polar group such as a phosphoric acid ester group. The above described resins can be used alone or in combination.

It is preferred that the above-described predetermined polyurethane resin contained in the lower magnetic layer be used in an amount of 15 wt. % or more, more preferably from 20 to 50 wt. % based on the binder in the lower layer, and that the predetermined polyurethane resin contained in the upper magnetic layer be used in an amount of 15 wt. % or more, more preferably from 20 to 50 wt. %, based on the binder in the upper layer. If the amounts of the predetermined polyurethane resins each is not more than the above values, the desired effects of this invention will not be achieved effectively.

Polyisocyanate is necessarily used in the upper magnetic layer of this invention, and it is preferred to also use polyisocyanate in the lower magnetic layer. The polyisocyanate compound used in both the layers is selected from those used as a hardening agent such as those conventionally used to harden a polyurethane resin. Non-limiting examples of polyisocyanate compounds include the reaction product of 3 moles of tolylene diisocyanate and 1 mole of trimethylol propane (e.g., "Desmodule L-75" produced by Bayer Co., Ltd.); the reaction product of 3 moles of diisocyanate such as xylylene diisocyanate or hexamethylene diisocyanate and 1 mole of trimethylol propane; the burett adduct product of 3 moles of hexamethylene diisocyanate; isocyanurate compounds of 5 moles of tolylene diisocyanate; isocyanurate adduct compounds of 3 moles of tolylene diisocyanate and 2 moles of hexamethylene diisocyanate; and polymers of isophorone diisocyanate or diphenylmethane diisocyanate.

When hardening treatment is conducted using electron beam radiation, compounds having a reactive double bond (e.g., urethane acrylate) can be used.

In this invention it is preferred to use a combination of (i) soft resins such as the polyurethane resins of this invention and (ii) hard resins such as vinyl chloride copolymer having a polar group such as a phosphoric acid ester group.

It is preferred that the vinyl chloride copolymer in the lower magnetic layer has a different molecular weight than the vinyl chloride copolymer in the upper magnetic layer, similar to the case of the polyurethane resins of this invention. Specifically, it is preferred that the vinyl chloride copolymer contained in the lower magnetic layer has a degree of polymerization of less than 400, and that the vinyl chloride copolymer contained in the upper magnetic layer has (i) a degree of polymerization of 400 or more and (ii) the above-described functional group having an active hydrogen. By such as constitution, the effects of this invention can effectively be obtained.

Generally, when ferromagnetic particles which have a low hardness (such as ferromagnetic metal fine particles) are used, a larger amount of binders is used than in the case when ferromagnetic particles which have a high hardness (such as $\gamma$-$Fe_2O_3$) are used. When the ferromagnetic particles have a lower hardness, the additive amount of soft resins such as polyurethane resins is generally increased.

The binders tend to soften as a result of increasing the additive amount of the polyurethane resins. Therefore, the hardness of the binder can be maintained by increasing the additive amount of a hardening agent such as a polyisocyanate compound.

In this invention, when polyurethane resins are used as a resin component and polyisocyanate compounds are used as a hardening agent, the weight ratio of the polyurethane resins to the polyisocyanate compounds in the upper magnetic layer is generally from 1:0.3 to 1:2, preferably from 1:1 to 1:1.5. These ratios can be applied to both the lower and upper magnetic layers of this invention. Even though ferromagnetic metal fine particles having a low hardness are used, binders which soften as a result of using polyurethane resins can effectively be prevented from softening by adjusting the above compounding ratio.

In a magnetic recording medium of the present invention, the total weight amount of resins and hardening agents in each of the upper and lower magnetic layers is preferably from 5 to 40 parts by weight, more preferably from 10 to 20 parts by weight per 100 parts by weight of the ferromagnetic particles in the upper or lower layer.

Examples of ferromagnetic particles for use in this invention include metal oxide ferromagnetic particles such as $\gamma$-$Fe_2O_3$, ferromagnetic particles of different metal-metal oxides such as $\gamma$-$Fe_2O_3$ containing another elements such as cobalt or the like, and ferromagnetic metal fine particles containing ferromagnetic metals such as iron, cobalt or nickel.

When ferromagnetic metal fine particles are used, it is preferred that such ferromagnetic metal fine particles contain iron, cobalt or nickel and have a specific surface area of 42 $m^2/g$ or higher, preferably 45 $m^2/g$ or higher.

Examples of ferromagnetic metal fine particles include ferromagnetic metals and alloys. The ferromagnetic metal fine particles preferably have a metal content of 75 wt. % or higher and more than 80 wt. % of the metal content is at least one of ferromagnetic metal or an alloy (e.g., Fe, Co, Ni, Fe-Co, Fe-Ni, Co-Ni, Co-Ni-Fe), and 20 wt. % or lower of the metal content may be other elements (e.g., Al, Si, S, Sc, Ti, V, Cr, Mn, Cu, Zn, Y, Mo, Rh, Pd, Ag, Sn, Sb, B, Ba, Ta, W, Re, Au, Hg, Pb, P, La, Ce, Pr, Nd, Te, Bi). The above-described ferromagnetic metal may contain a slight amount of water, hydroxides or oxides.

The method for preparing these ferromagnetic particles is well known in the art, and ferromagnetic particles for use in this invention can be prepared by a conventional method.

The shape of the ferromagnetic particles is not particularly limited, and generally acicular, grain-like, dice-like, rice grain-like and plate-like particles are used. In this invention, acicular ferromagnetic particles are preferred.

The above-described resins, hardening agents and ferromagnetic particles are mixed, kneaded and dispersed with solvents generally used for preparing a magnetic coating composition (e.g., methyl ethyl ketone, dioxane, cyclohexane, ethyl acetate) to prepare a magnetic coating composition. Mixing, kneading and dispersing can be done in a conventional manner.

Conventional additives such as abrasive agents (e.g., α-Al$_2$O$_3$, Cr$_2$O$_3$), antistatic agents (e.g., carbon black), lubricating agents (e.g., fatty acid, fatty acid esters, silicon oil) or dispersing agents, and filling materials (agents) may be included in the magnetic coating composition in addition to the above-described compositions.

The thus-prepared magnetic coating composition containing the above-described materials may be coated on a non-magnetic support in the following manner. A coating composition for the lower magnetic layer is prepared by mixing, kneading, and dispersing resins, ferromagnetic particles and, if desired, hardening agents with solvents. Then, a coating composition for the upper magnetic layer is prepared in a similar manner.

A preferred method for preparing a magnetic recording medium of this invention is so-called wet-on-wet method which comprises, for example, coating a magnetic coating composition for the lower a magnetic layer on a surface of a running non-magnetic support so that the dry thickness of the lower magnetic layer is from 0.1 to 5 μm, more preferably from 1 to 3 μm, and while the coated layer is wet, successively coating thereon a coating composition for the upper magnetic layer so that the dry thickness of the upper magnetic layer is from 0.1 to 1.5 μm, more preferably from 0.3 to 1.3 μm. When two layers are successively coated. When an extruding coating device is used, two extruding devices may be installed at such positions that these devices sandwich the running non-magnetic support, or alternatively, two devices may be installed at a certain interval distance so that the upper layer can be coated while the lower magnetic layer is wet (i.e., the state wherein the layer contains a solvent and exhibits adhesiveness).

The coating devices for coating the above-described magnetic coating composition include an air doctor coating device, a blade coating device, a rod coating device, an extruding coating device, an air knife coating device, a squeeze coating device, an impregnating coating device, a reverse roll coating device, a transfer roll coating device, a gravure coating device, a kiss coating device, a cast coating device, a spray coating device and a spin coating device. In this invention, an extruding coating device for simultaneously multicoating and having two slots as disclosed in JP-A-62-124631 is preferred.

The thus prepared upper magnetic layer is preferably an extremely thin layer having a thickness of 1.5 μm or lower and the surface thereof can be coated extremely smooth. As a result, a magnetic recording medium having excellent running durability without deteriorated electromagnetic conversion characteristics can be obtained.

The above-described magnetic coating compositions are preferably coated so that the total thickness of the magnetic layers including the lower and upper magnetic layers is from 0.5 to 10 μm.

A backing layer may be provided on the surface of the non-magnetic support which is opposite to the surface provided with the magnetic layers. The backing layer is generally formed by coating with a coating composition containing granular components such as abrasive agents or antistatic agents and binders dispersed in an organic solvent.

An adhesive layer may be provided on the surface of the non-magnetic support which is coated with a magnetic coating composition and on the surface of the support which is coated with a coating composition for forming a backing layer.

The coated layers formed by coating with the magnetic coating compositions is generally provided with treatment for orientating the ferromagnetic particles contained in the composition, that is, the layer is provided with magnetic orientation, and then dried.

The thus-dried composite magnetic layer (i.e., the combination of all the magnetic layers) is then subjected to a surface smoothing treatment. A super calender roll is, for example, used for surface smoothing treatment. Voids generated as a result of removing solvents upon drying disappear by providing surface smoothing treatment, thereby improving the packing density of the ferromagnetic particles in the magnetic layer. Thus, a magnetic recording medium having high electromagnetic conversion characteristics can be obtained.

The thus hardened laminate (i.e., the support coated with the magnetic layers, etc.) is then cut to a desired shape. Cutting may be conducted using a commonly used cutting device such as a slitter at a normal condition.

The magnetic recording medium of this invention has been described, referring to a two layer system, i.e. a system comprising an upper and a lower layer. The magnetic recording medium of this invention may have three magnetic layers or more provided that the magnetic recording medium has at least two magnetic layers having properties as defined in this invention.

This invention will be illustrated in more detail by the following Examples and Comparative Examples. However, the invention is not to be construed as being limited to the Examples. In each example, all parts are by weight unless otherwise mentioned.

EXAMPLE 1

| Coating composition for the lower magnetic layer: | |
|---|---|
| Co-γ-Fe$_2$O$_3$ (Hc: 650 Oe, S$_{BET}$ specific surface area: 35 m$^2$/g) | 100 parts |
| Vinyl chloride/vinyl/acetate maleic anhydride copolymer (Composition ratio: 86:13:1, Degree of polymerization: 400) | 12 parts |
| Polyester polyurethane resin (Mn: 23,000, Tg: 5° C.) | 6 parts |
| Carbon black | 8 parts |
| Butyl stearate | 1 part |
| Stearic acid | 2 parts |
| Butyl acetate | 200 parts |
| Coating composition for the upper magnetic layer: | |
| Co-γ-Fe$_2$O$_3$ (Hc: 700 Oe, S$_{BET}$ specific surface area: 40 m$^2$/g) | 100 parts |
| Vinyl chloride.vinyl acetate. maleic anhydride copolymer (Composition ratio: 86:13:1, Degree of polymerization: 400) | 12 parts |
| Polyester polurethane resin (Number average Molecular Weight (Mn: 28,000, Tg: 3° C., number of —OH: 3/molecule) | 7 parts |
| Polyisocyanate ("Collonate L", produced by Nippon Polyurethane Co., Ltd.) | 5 parts |
| Carbon black | 3 parts |
| α-Al$_2$O$_3$ (average particle diameter: 0.6 μm) | 5 parts |
| Butyl stearate | 1 part |
| Stearic acid | 2 parts |
| Butyl acetate | 200 parts |

Each of the above coating compositions was mixed, kneaded and dispersed in a sand mill, and to the thus-obtained dispersion, 6 parts of polyisocyanate (above described "Collonate L") and 40 parts of butyl acetate were added, and the resulting composition was filtrated using a filter having an average pore diameter of 1 μm to prepare compositions for the lower and the upper magnetic layers, respectively.

The coating compositions for forming the lower and the upper magnetic layers were applied by using an extruding coating device for simultaneous multicoating, where the device has a slot for coating the lower magnetic layer and a slot for coating the upper magnetic layer in the following manner.

The coating composition for the lower magnetic layer was coated in a dry thickness of 3.5 μm on a polyethylene terephthalate support having a thickness of 14 μm using an extruding coating device having a slot for coating the lower magnetic layer, and immediately thereafter while the lower magnetic layer was wet, the coating composition for the upper magnetic layer was coated in a dry thickness of 0.5 μm using an extruding coating device having a slot for coating the upper magnetic layer. While being coated, the support was travelling at a speed of 60 m/min. While the magnetic layers were wet, it was subjected to magnetic orientation using magnets, dried, subjected to super-calendering treatment, and then slit to a width of ½ inch to prepare a video tape.

EXAMPLES 2 TO 8 AND COMPARATIVE EXAMPLES 1 TO 3

Video tapes were prepared in the same manner as in Example 1, except that polyester polyurethane resins as shown in Table 1 were used in the coating compositions for the lower the upper magnetic layers.

TABLE 1

| | Lower magnetic layer Polyurethane | | Upper magnetic layer Polyurethane | | |
|---|---|---|---|---|---|
| | Mn | Tg (°C.) | Mn | Tg (°C.) | Active hydrogen |
| Examples | | | | | |
| 1 | 23,000 | 5 | 28,000 | 3 | —CH (3) |
| 2 | 23,000 | 5 | 29,000 | 5 | —OH (5) |
| 3 | 23,000 | 5 | 28,000 | 3 | —NH₂ (3) |
| 4 | 23,000 | 5 | 28,000 | 25 | —OH (3) |
| 5 | 23,000 | 5 | 28,000 | −10 | —OH (3) |
| 6 | 23,000 | 5 | 28,000 | −30 | —OH (3) |
| 7 | 23,000 | −10 | 28,000 | 3 | —OH (3) |
| 8 | 23,000 | −32 | 28,000 | 3 | —OH (3) |
| Comparative Examples | | | | | |
| 1 | 23,000 | 5 | 28,000 | 3 | —OH (2) |
| 2 | 23,000 | 5 | 23,000 | 5 | —OH (2) |
| 3 | 28,000 | 5 | 28,000 | 3 | —OH (2) |

In Table 1, "active hydrogen" means an organic group having active hydrogen, and the number in parentheses means the number of the functional groups per 1 molecule of polyurethane resin.

The properties of each tape obtained in Examples 1 to 8 and Comparative Examples 1 to 3 were evaluated in the following manner and the results thereof are shown in Table 2.

Measurement (1) Still-life durability

Certain video signals were recorded on the thus-prepared video tapes using a VHS video tape recorder ("NV-8200" produced by Matsushita Electric Industrial Co., Ltd.) and the period of time for the reproduced still images to lose their clarity was measured, at 5° C. and at 80% RH.

(2) Number of times of head clogging

Certain video signals were recorded on the thus-prepared video tapes using the above VHS video tape recorder, and while the recorded tapes of 120 min. length were run repeatedly for 10 passes, the number of times the output decreased for 3 dB or more was measured, at 5° C. and 80%RH.

(3) Adhesive strength between the non-magnetic support and the magnetic layer

Adhesive strength is defined by the weight required to peel off the magnetic layer of the video tape from the support, where the width of the video tape was ½ inch, its length was 5 cm, and the weight was applied to the support at an angle of 180° away from the magnetic layer.

TABLE 2

| | Number of occurrences of head clogging | Still-life durability (min) | Adhesive strength (g) |
|---|---|---|---|
| Example 1 | 2 | 42 | 83 |
| Example 2 | 2 | 58 | 92 |
| Example 3 | 1 | 45 | 86 |
| Example 4 | 0 | 120< | 80 |
| Example 5 | 4 | 30 | 83 |
| Example 6 | 6 | 28 | 82 |
| Example 7 | 0 | 120< | 170 |
| Example 8 | 0 | 120< | 190 |
| Comparative Example 1 | 18 | 1 | 86 |
| Comparative Example 2 | 25 | 1> | 90 |
| Comparative Example 3 | 18 | 1 | 40 |

As is clear from Table 2, the magnetic recording medium of this invention using polyester polyurethane having a number average molecular weight of not more than 25,000 in the lower magnetic layer and using polyester polyurethane having (i) at least three active hydrogens per each polyurethane molecule and (ii) a number average molecular weight of 25,000 or more in the upper magnetic layer is excellent with respect to all properties such as the number of occurrences of head clogging, still-life durability, adhesive strength, and running durability. Particularly, when the glass transition temperature (Tg) of the upper magnetic layer is adjusted to 0° C. or lower, the adhesive strength is further improved in addition to still-life durability (Example 4). A magnetic recording medium having extremely excellent durability can be obtained (Examples 7 and 8) according to the present invention.

On the other hand, a conventional magnetic recording medium using polyester polyurethane having two active hydrogens per molecule of polyurethane is inferior with respect to the number of occurrences of head clogging and running durability such as still-life durability.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having thereon a lower magnetic layer and a upper magnetic layer, in this order, wherein said lower magnetic layer contains as a binder a polyurethane resin having a number average molecular weight of less than 25,000, and said upper magnetic layer contains as a binder (a) a polyurethane resin having (i) at least three organic groups having an active hydrogen per polyurethane molecule and (ii) a number average molecular weight of 25,000 or more, and (b) a polyisocyanate.

2. A magnetic recording medium as claimed in claim 1, wherein said polyurethane resin contained in said lower magnetic layer has a glass transition temperature of less than 0° C.

3. A magnetic recording medium as claimed in claim 1, wherein said polyurethane resin contained in said upper magnetic layer has a glass transition temperature of 0° C. or higher.

4. A magnetic recording medium as claimed in claim 1, wherein each of said organic groups having an active hydrogen is selected from the group consisting of —OH, —NH$_2$ and —NHR, wherein R represents an alkyl group having from 1 to 3 carbon atoms.

5. A magnetic recording medium as claimed in claim 1, wherein said binder in said upper magnetic layer and/or in said lower magnetic layer further contains a vinyl chloride copolymer.

6. A magnetic recording medium as claimed in claim 1, wherein said polyurethane resin contained in said lower magnetic layer has a number average molecular weight of from 5,000 to 20,000.

7. A magnetic recording medium as claimed in claim 1, wherein said polyurethane resin contained in said upper magnetic layer has a number average molecular weight of from 25,000 to 50,000.

8. A magnetic recording medium as claimed in claim 1, wherein said polyurethane resin contained in said lower magnetic layer is present in an amount of 15 wt. % or more based on said binder in said lower magnetic layer, and said polyurethane resin contained in said upper magnetic layer is present in an amount of 15 wt. % or more based on said binder in said upper magnetic layer.

9. A magnetic recording medium as claimed in claim 1, wherein said binder in said lower magnetic layer further contains a polyisocyanate.

10. A magnetic recording medium as claimed in claim 5, wherein said vinyl chloride copolymer contained in said lower magnetic layer has a degree of polymerization of less than 400, and said vinyl chloride copolymer contained in said upper magnetic layer has (i) a degree of polymerization of 400 or more and (ii) a functional group having an active hydrogen.

11. A magnetic recording medium as claimed in claim 1, wherein the weight ratio of said polyurethane resin to said polyisocyanate in said upper layer is from 1:0.8 to 1:2.

12. A magnetic recording medium as claimed in claim 1, wherein the total amount of said binder in said upper layer is from 5 to 40 parts by weight per 100 parts by weight of ferromagnetic particles in said upper layer.

13. A magnetic recording medium as claimed in claim 1, wherein the thickness of said lower magnetic layer is from 0.1 to 5 μm, and the thickness of said upper magnetic layer is from 0.1 to 1.5 μm.

14. A magnetic recording medium as claimed in claim 1, wherein the thickness of said lower magnetic layer and said upper magnetic layer is from 0.5 to 10 μm.

* * * * *